Patented June 15, 1943

2,321,625

UNITED STATES PATENT OFFICE 2,321,625

TREATING ANIMAL TISSUE

John M. Ramsbottom and Levi Scott Paddock, Chicago, Ill., assignors to Industrial Patents Corporation, Chicago, Ill., a corporation of Delaware No Drawing. Original application March 10, 1941, Serial No. 382,590. Divided and this application December 31, 1941, Serial No. 425,208

15 Claims. (Cl. 99—107)

This invention relates to the treatment of animal tissues and has to do particularly with the treatment of flesh and intestines with plant enzymic material to improve the value thereof.

One of the objects of this invention is to provide a method whereby animal tissue may be rendered tender and improved in other properties.

Another object of this invention is to provide a method whereby the flesh of edible animal carcasses may be rendered tender.

Another object of this invention is to provide a method whereby animal intestines may be rendered tender and more adaptable for use as sausage casings.

Another object of this invention is to provide a method of treating natural sausage casings to increase the stretchability of the casings and to increase the stuffing capacity of the casings.

Another object of this invention is to provide a method whereby the smoking properties of the casings may be altered.

Another object of the invention is to provide a method whereby such tough casings as hog casings and Indian sheep casings may be tendered to any desired extent and rendered useful in the manufacture of high grade sausage products which require a tender casing.

Still another object of the invention is to so alter normally tough meat and other animal tissue as to render the same substantially more tender and, therefore, more fit for human consumption.

A further object of the invention is to provide meat and animal casings which have been treated so as to materially improve the physical properties thereof, and which in particular have had the tenderness properties thereof greatly increased.

A further object of the invention is to provide a tenderized natural casing for use in making sausages and the like.

A still further object of the invention is to provide a hog, beef and/or Indian sheep casing having a tenderness at least equal to that of untenderized domestic sheep casings.

Another object of the invention is to provide hog casings, Indian sheep casings, etc., having a tenderness greater than that of untenderized or untreated domestic sheep casings.

Another object of the invention is to so modify the tissue of certain animal casings heretofore considered unsatisfactory for making sausages and the like as to render the same of the same usefulness as domestic sheep casings.

Still another object of the invention is to render the manufacture of sausages and the like more economical by making it possible to utilize in such manufacture inherently tough natural casings which were heretofore considered unsatisfactory for the purpose.

A still further object of the invention is to provide meat tissue and natural casings which have been tenderized by treatment with enzyme material.

Other objects and advantages of this invention will become apparent from the description and claims which follow.

The process is applicable to the treatment of various types of animal tissue, such as wholesale or retail cuts of meat, including beef and pork. It is also applicable to the treatment of meat in various degrees of comminution, such as hamburger, sausage and the like. The treatment of sausage may take place before or after the meat is stuffed into casings.

The invention is particularly adaptable to the treatment of hog casings, Indian sheep casings, and beef casings although it is not limited to the treatment of these specific types of materials.

Natural casings, as distinguished from artificial or synthetic casings, are prepared from the intestines of edible animals, such as cattle, swine and sheep. After the intestines are removed from the carcass, they are cleaned and a tubular membrane appropriate for sausage casings is obtained.

Sheep casings command a higher price because they generally possess more desirable physical properties than hog casings, Indian sheep casings and beef casings. Hog casings are suited for the manufacture of frankfurters and other sausages similar in size, but because of physical characteristics they cannot be successfully used in the manufacture of high grade frankfurters and fresh pork sausages because the casing is objectionable, being difficult to masticate. The same is true of Indian sheep casings and beef casings. Moreover, the casing is the most difficult part of the sausage to digest, and it is also highly desirable to have a casing possessing a greater stretchability so that the ratio of casing to sausage meat may be reduced to as low a point as possible.

The present invention contemplates the treatment of animal tissue including natural casings prepared from animal intestines with a solution of a proteolytic enzyme obtained from a plant, such as plant juice or extract containing a proteolytic enzyme, and controlling the action of the plant enzyme on the tissue in such a way that the desired physical properties of the tissue are improved efficiently and quickly without undue digestion or other undesirable effects.

We are aware that it has been proposed heretofore to treat meat with certain enzymes to obtain tendering. For example, the patent to Paddock, et al., United States Patent No. 2,043,392, discloses the injection of proteolytic enzymes into the vascular system of carcass beef and then holding the treated product under refrigeration. There is no disclosure in that patent of treating natural casings with an enzyme nor the treatment of animal tissue under the conditions of the present invention whereby applicants' results could be obtained. The patent to Marcano, United States Patent No. 441,181, discloses the preparation of a meat peptone in which the meat is completely disintegrated into a liquid or soluble pasty form. The Marcano patent has no disclosure of tendering any kind of animal tissue.

According to the present invention, animal tissue is treated with a plant proteolytic enzyme solution under conditions of treatment including strength of the plant enzymic solution, temperature, and time, coupled with steps of operation whereby new and different results from the prior art are obtained.

The proteolytic enzymes and their solutions are generally prepared from fresh or frozen enzymic plant juices or extracts, which have not been subjected to a temperature sufficiently high to destroy the enzymatic action. Included among the plant juices and the corresponding proteolytic plant enzymes which may be employed in the present process are milkweed juice containing asclepain, papaya juice containing papain, pineapple juice containing bromelin, fig juice containing ficin, osage orange juice containing macin and mushroom juice containing mushroom proteolytic enzyme. The natural plant juices containing a proteolytic enzyme and/or mixtures thereof are usually employed in preparing the treating solution, but other solutions of the plant proteolytic enzyme or enzymes can be used. Solutions containing about 1 part of enzymic plant juice to about 5 or 6 parts or more of water are often used under the conditions of treatment herein specified, although satisfactory results may be obtained by using undiluted extracts or extracts diluted with water up to about 200 parts of water. The concentrations vary with the nature of the tissue treated, the activity and type of enzyme employed, and the other conditions such as time, temperature and method of operation.

The enzymic juice or extract may be obtained by pressing the fruit in the case of the pineapple, osage orange, papaya and fig enzymes. The mushroom enzyme juice may be obtained by pressing the plant. The milkweed, osage orange, papaya and fig enzyme extract may be recovered by pressing the fresh leaves, stems, stalks and sap wood of these plants. The proteolytic plant enzyme may be isolated from the appropriate juice or extract source by any method suitable for the isolation of a proteolytic enzyme. These methods include precipitation with ethyl alcohol, acetone, methyl alcohol, salts and the like. Solutions containing the natural proteolytic plant enzyme juice, for example papaya juice, milkweed juice and/or pineapple juice, in concentrations of a fraction of a percent to 100% may be satisfactorily employed. Corresponding solutions of the isolated enzyme may contain as low as 0.002% of the enzyme or even lower, and as high as 5% or more of the enzyme. For example, a solution containing preparations of about 0.005% to 0.05% of the enzyme is generally satisfactory, although solutions containing active plant enzymes in larger amounts, for example 0.05% to 0.5% or more are contemplated for our use. Solutions of the lower range are usually used for treating meat. Solutions of the higher range, approximately 10 times the concentration for tenderizing meat, are more satisfactory for treating intestinal tissue, such as natural casings.

In the use of solutions of the plant enzymes it has been found that these proteolytic enzymes are generally most active when employed in a solution having a hydrogen ion concentration approximating that of the extract or juice. However, these enzymes are active when used in solutions varying over a wide range of hydrogen ion concentrations, e. g., a pH between about 3 or 4 and 8.5. It is advantageous to maintain the pH value below 7 for maximum enzyme activity, for advantages in dye absorption by the products, and, particularly, for treating meat and stuffed sausages in order to avoid an alkaline reaction on the meat which would stimulate undesirable bacterial growth.

The natural juice or other solution of proteolytic plant enzymes may be applied to the tissue in any suitable manner as by washing, soaking, injecting, spraying, dipping or wiping.

It will be understood that the time of treatment, the temperature of treatment, and the concentration and activity of the solution are all variable and should be adjusted to secure the desired extent of tendering, which is dependent upon the type and the initial toughness of the tissue. The activity of the proteolytic plant enzyme increases with increasing temperature until a condition of greatest activity is generally reached at temperatures between about 140° and 160° F. The enzyme activity is destroyed at a temperature between about 160° and 185° F. These temperatures vary slightly with the different enzymes. For example, papain or papaya juice is operative at slightly higher temperatures, e. g., 175° F., whereas the mushroom enzyme may sometimes be inactivated at temperatures of about 150° to 160° F.

The product previously treated with the enzyme by any of the methods described hereinbefore is subjected to a temperature within the range of enzyme activity but above refrigeration temperatures, preferably between 60° and 140° F. and maintained at such temperature in contact with the previously applied proteolytic enzyme for a sufficient length of time to permit the enzyme to act upon the tissue, whereby the desired alteration in physical properties is effected. The temperature may then be raised to a point sufficiently high, for example, to a temperature between about 165° and 185° F. to inactivate the enzyme and avoid excessive action on the tissue. As an alternative method, the treated product may be thoroughly flushed with water before or after the final heat treatment to remove the major portion of the enzymatic material. The action of the enzyme may be terminated by other means than heating or washing, such as the application of a suitable chemical reagent.

In the treatment of meat tissue the enzyme solution may be applied to the meat by any of the foregoing methods. The previously treated meat is then held at a temperature of above about 60° F. and within the range of enzymic activity until the desired degree of tenderization takes place. The temperature of the meat is then raised to a point at which the treating enzyme is substantially inactivated. This tenderization process may be accomplished by gradually heating the meat to which the enzyme has been applied from room temperature to cooking temperature and finally enzyme inactivation temperature. The temperature rise through the gradient is at such a rate that the meat is tenderized by the enzyme in its active range. When the desired degree of tendering results, the temperature is substantially raised to stop further enzymic action. The type, toughness and size of the meat cut, and the quantity and activity of the enzyme, determine the time and temperature of heat treating.

As an illustration of the tenderizing of meat by this process, a normally tough muscle from the hind shank of the right side of a beef carcass (peroneus tertius) was treated with an enzyme solution containing preparations of about 0.012% asclepain, 0.012% papain, 0.008% ficin, 0.015% macin, 0.035% bromelin or 2% mushroom enzyme by injecting the solution into the primary artery supplying the circulatory system of the cut. The amount of enzyme solution injected was about 8% of the muscle weight. An enzyme-treated right side muscle and a non-treated control left side muscle were cut into slices about one-half inch thick. These slices were heated gradually from room temperature to a temperature of about 160° F. in about 10 to 15 minutes. The enzyme was then inactivated by quickly raising the temperature substantially above this value. The cooked, treated product was compared with the cooked control. In all cases the treated muscle slices were tender whereas the control muscle slices were tough.

It is possible to similarly prepare treated beef rounds to obtain steaks and roasts which when heat treated first in the active enzyme temperature range followed by a high heat treatment to inactivate the enzyme will yield cooked cuts substantially more tender than those not so treated with enzymes. In all these treatments the steaks and roasts are fried, broiled or roasted to an inside temperature of at least 160° F. and tenderness comparisons made on the cooked meat. Of course with these larger cuts longer periods of treatment, for example, up to 1 hour or more, are generally necessary in order to raise the temperature throughout the meat, through the active enzyme range.

In treating the beef rounds the enzyme solution alternatively may be introduced into the cut by means of hypodermic needles until the desired amount of enzyme solution based on the weight of muscle is obtained. For example, an aqueous solution containing preparations of about 0.012% asclepain, 0.05% mushroom enzyme, 0.012% papain, 0.005% ficin, 0.015% macin, or about 0.035% bromelin or an equivalent dilute plant juice may be injected by needles into the cuts of meat or into the circulatory system of a meat cut or a carcass in an amount equal to about 6% of the weight of the meat to prepare it for the heat tenderizing treatment.

In the treatment of sausage casings, the natural juice or other solution of proteolytic plant enzyme may be applied to the casing in any suitable manner as by washing or soaking the casings in the solution, adding the enzyme or juice to the sausage cook water or spraying, dipping or wiping the casing with the enzyme solution or juice after the casing has been stuffed with sausage meat. The casing may be treated, however, before or after stuffing and greater improvement in stretchability is sometimes obtained by treatment before stuffing.

The casing with the applied enzyme may be heated to a temperature above about 60° F., for example, between about 110° and 140° F., and maintained at such temperature for a sufficient length of time to permit the enzyme to attack the tissue to the desired extent, e. g., ½ to 3 hours. The temperature is then raised to a point high enough to destroy the major portion of the enzyme and avoid excessive action on the casing.

The improvement of the stuffed casing by this enzymic action is preferably accomplished in two steps; a conditioning of the stuffed casing at a lower temperature, e. g., 80° to 90° F., followed by the smoking of the stuffed casing at a higher temperature, after which the enzyme is inactivated, e. g., by cooking. In some instances it may be desirable to omit the separate tempering or conditioning step and to secure the conditioning and smoking in a single operation. When the conditioning and smoking take place in one operation the temperature in the smoke house may be raised through a wide range, at least a portion of which is in the field of enzymic activity, and the temperature rise through this gradient may be rather slow.

The present invention may be practiced by treating the casings after stuffing as well as before stuffing. In the treatment of casings after stuffing, basins or receptacles may be placed at the end of a conventional stuffing table. One basin is equipped with an overflow and warm water is passed continuously through the basin; the other basin may serve as a receptacle for the juice or juices or other solution of proteolytic plant enzyme or enzymes. A satisfactory aqueous solution may be prepared containing preparations of about 0.12% asclepain, 0.12% papain, 0.08% ficin, 0.15% macin, or 0.5% mushroom enzyme, or an equivalent quantity of plant juice, e. g., 15% pineapple juice. The concentration and activity of the solution will vary with the type of casing which is to be treated but the above values are good for average production. The enzyme solution is then placed in the proper receptacle. After the sausages are stuffed and linked, the operator dips the sausages in the warm running water basin, immersing the sausages 2 or 3 times to rinse off particles of meat from the surface of the casings. The sausages are then immersed 2 or 3 times in the enzyme solution, care being taken to have the solution reach all portions of the outside surface of the casings. In the commercial treatment of natural casings, we prefer to spray the stuffed casings with one of the foregoing aqueous enzyme solutions containing about 0.1% papain, ficin or asclepain, 0.5% mushroom juice enzyme, or about 0.35% bromelin.

It will be understood, of course, that the time of treatment, the temperature of treatment, and the concentration and activity of the solution are all variable and may be adjusted at will to secure the desired alterations in the physical properties of the casings, and are dependent upon the use to which the casings are to be put and the initial properties of the casings.

After the application of one of the enzyme solutions by any of the foregoing methods, the product with the enzyme or enzymes thereon may be placed in a tempering room for a period of about 1 hour and 30 minutes with an air temperature of from 80° to 120° F., preferably about 80° to 90° F., and a relative humidity of about 80% to 85%. The product is then removed to a preheated smoke house having temperatures sufficiently high to cure the product, for example, at a temperature of from 120° to 170° F. The product is usually kept in the smoke house for about 45 minutes up to 1 or 2 hours, during which time a gradual increase in temperature from about 120° to 150° or 160° F. may be obtained over a period of about 1½ hours. The air temperature, if desired, may then be raised to 170° to 200° F., for example, to a temperature of about 170° F. and maintained at this temperature for about 15 minutes. Preferably after the curing operation, the product may be cooked in water or steam in which case it is desirable not to exceed a temperature of about 180° F. The preferred cooking treatment, however, is to place the frame with the smoked sausage links in a cooking chamber where the sausages are sprayed with hot water at a temperature of about 170° F. for about 12 to 15 minutes, thereby inactivating and removing the enzymes. A direct steam chamber at the same temperature may be employed.

The treatment of natural casings according to the present invention produces a product of greatly improved tenderness. For example, ordinary untreated casings are often so tough that it is difficult to break or puncture a stuffed sausage by bending, biting, chewing or pulling, whereas the casings treated by the present invention are easily broken by bending and may be readily punctured by gentle pressure with a finger or thumb.

The improvement in and uniformity of tenderness of the treated casings may be more precisely shown by penetrometer measurements of the force necessary to puncture a sausage casing. The penetrometer consists of a steel ball having a diameter of $\frac{1}{16}''$ mounted upon a rod having a smaller diameter which is attached to a pressure gauge. A measure of the toughness of the casing may be obtained by puncturing the stuffed casing with the steel ball. In the particular penetrometer employed in testing the sausage casings, the scale was calibrated in one-twentieths of a pound. The following data illustrate representative penetrometer readings obtained by puncturing untreated casings and treated casings prepared as described above, employing the pineapple juice diluted with about 6 parts of water:

| Untreated casings | Treated casings |
| --- | --- |
| Penetrometer reading | Penetrometer reading |
| 92 | 54 |
| 74 | 56 |
| 88 | 63 |
| 86 | 53 |
| 75 | 63 |
| 84 | 56 |

The deviation in penetrometer readings of the untreated casings was 18 whereas the deviation in the case of the treated casings was 10. The data represent quite clearly that the treatment of the casings results in a far more uniform as well as tenderer product. By way of further interpretation of the above data on penetrometer tests, it will be noted that the average reading for untreated casings is 83.16, whereas the average reading for treated casings is 57.5. Calculated in percentage, the resistance to penetration by the $\frac{1}{16}$-inch diameter steel ball was about 31% less for the treated casings than for the untreated casings. In other words, the sausages with treated casings offered about one-third less resistance to penetration by the ball than like sausages having untreated casings.

In a more comprehensive test of other groups of casings similar results were obtained. In a statistical analysis of these data, it was found that the standard deviation between treated casings is about one-half as great as the standard deviation between untreated casings. The following table illustrates the results obtained in tests of 140 samples of treated casings and untreated casings:

| No. of samples | Character of samples | Average reading | Standard deviation |
| --- | --- | --- | --- |
| 140 | Treated | 75.7 | 11.9 |
| 140 | Untreated | 122.2 | 22.8 |

If the resistance to penetration is calculated on the basis of the above average readings, it will be found that the treated casings offered about 38% less resistance to penetration than similar untreated casings. Again, the treated casings were roughly about one-third less resistant to penetration than untreated casings graded to the same size.

The process of the present invention also produces other improved properties in the treated casing. Among these are increased translucency and improved smoking properties. These improved properties appear to be due at least in part to an increased quantity of water absorbed by the casing. The treatment of a casing with pineapple juice or a dilute aqueous solution of bromelin produces a noticeable tendency for the casing to swell accompanied by a marked increase in the amount of water absorbed by the casing. As a result, smoke penetrates the wet surface more rapidly and to a greater extent than the drier surface of an ordinary casing. Moreover, the casing dries out more slowly than an untreated casing and, as a result, provides a longer effective smoke period due to the more rapid and continued penetration of the smoke.

The increase in the water absorbing property of treated casings as compared to untreated casings may be illustrated by the data given below. Casings graded to the same size were selected, one group being handled in the normal conventional manner, the other group being treated in accordance with the present invention. In the treatment of the casings in accordance with conventional practice, the salted casings were soaked in water to remove the salt and were then flushed with water. The other group of casings was soaked in water for about 30 minutes to remove the salt, treated with a pineapple juice solution consisting of about 1 part of pineapple juice to 6 parts of water, held in contact with the applied enzyme at a temperature of from 70° to 75° F. for about 2 hours, and then flushed with water. The percentage gain in weight of the treated and untreated casings was found to be as follows:

| Untreated casings, per cent gain | Treated casings, per cent gain |
| --- | --- |
| 42 | 88 |
| 38 | 114 |
| 35 | 102 |
| 28 | 72 |
| 33 | 75 |
| 33 | 71 |
| Average 35 | 87 |

Thus, it is evident from the foregoing average percentages that the treated casings absorbed about 52% more water than the untreated casings, or, stated another way, about 2½ times as much water.

Furthermore, the treatment of natural casings in accordance with our invention increases the stretchability of the casings and thereby increases the stuffing capacity of the casings. In the data which follow, casings graded to the same size were handled as described above to prepare the casings for stuffing. All of the casings were then subjected to the identical stuffing operation, and, after stuffing, the diameter of the casings was measured. Each of the figures in the table which follows represents the average diameter of sausage prepared from a bundle of casings, each of the bundles containing 102 yards of casing.

| Untreated casings | Treated casings |
| --- | --- |
| Mm. | Mm. |
| 28.1 | 31.2 |
| 28.5 | 30.7 |
| 28.5 | 31.1 |
| Average 28.4 | 31.0 |

The sausages were also weighed to obtain the weight of sausage meat. The data in the table which follows represent the weight of the stuffed casing per standard bundle of 102 yards of casing.

| Untreated casings | Treated casings |
| --- | --- |
| Pounds | Pounds |
| 105.0 | 110.5 |
| 107.5 | 120.0 |
| 92.0 | 112.0 |
| Average 101.8 | 114.2 |

The increase in stuffing capacity in the foregoing groups of casings was approximately 11%.

The increase in stuffing capacity will, in general, vary from about 8% to about 15%, depending upon the characteristics of the casings, concentration of the juice used, and upon the length of the period of treatment of the casings. The above data illustrate a representative increase in the stretchability and stuffing capacity of casings treated in accordance with this invention.

The treatment of the casings with the proteolytic plant juice or other aqueous solution of proteolytic plant enzymes renders the casings more slippery than conventional casings. Before stuffing, casings are placed upon or threaded on a stuffing horn and it is desirable to have the casing as slippery as possible so that it may be easily threaded on the stuffing horn. In conventional practice, a water connection is provided on the stuffing table and the operator places the casing over the water nozzle and admits a small amount of water prior to threading the casing upon the stuffing horn. Casings treated in accordance with our invention may be placed on the stuffing horn without first admitting a small amount of water to the casing.

The dye absorption properties of the casings are also improved by the present process in that the casings require a smaller concentration of dye to produce the same intensity of color as compared to untreated casings. This is important when the product is labeled by stamping using a dye for the purpose.

This application is a division of our continuation-in-part application, Serial No. 382,590, filed March 10, 1941, which in turn is a continuation-in-part of our application, Serial No. 301,957, filed October 30, 1939, which application is a continuation-in-part of our application, Serial No. 225,566, filed August 18, 1938.

Obviously, many modifications and variations of the invention hereinbefore set forth may be made without departing from the spirit and scope thereof, and therefore only such limitations should be imposed as are indicated in the appended claims.

We claim:

1. Meat containing an aqueous solution of a proteolytic enzyme material in an amount equal to about 6% of the weight of said meat to condition said meat for heat tenderizing treatment.

2. As a new article of commerce, an enzyme tenderized natural casing for use in making sausages and the like and characterized further by substantial increased stretchability as compared with an identical untenderized casing.

3. A new article of commerce for use in sausage manufacture, a normally tough natural casing enzyme tenderized to the extent that it has a tenderness at least equal to that of untenderized domestic sheep casings and said casing being further characterized by possessing only partial disintegration and yet having increased attributes of stretchability, translucency, smoking properties and slipperiness as compared with the natural untenderized product.

4. As a new article of commerce for use in making sausages, a tenderized hog casing having a tenderness at least equal to that of untenderized domestic sheep casings.

5. As a new article of commerce, a tenderized hog casing for use in making sausages characterized by materially greater stretchability, translucency, smokability and slipperiness as compared to a similar untreated hog casing.

6. As a new article of commerce for use in making sausages, a tenderized natural casing characterized by increased stretchability enabling the same to receive at least 8% more meat than could be stuffed into the same casing if untenderized.

7. As a new article of commerce, an enzyme tenderized natural casing for use in making sausages and the like characterized by containing at least twice the amount of water as a like but untenderized casing graded to the same size.

8. As a new product of manufacture, sausages having enzyme tenderized but only partially disintegrated natural casings and which tenderized casings are further characterized by greatly increased stretchability whereby to permit increased stuffing as compared with the identical untenderized product.

9. As a new product of manufacture, sausages in tenderized natural casings characterized by said casings having their resistance to penetration by a $\frac{1}{16}$-inch diameter steel ball reduced by about one-third as compared with similar sausages in untenderized casings graded to the same size.

10. The product as defined in claim 7 which is further characterized by having its weight increased about 71 to 114% by absorption of water resulting from tenderization treatment.

11. The product as defined in claim 8 in which the casings are hog casings.

12. An enzyme tenderized normally tough natural casing characterized by only partial enzymic disintegration, possessing greatly increased stretchability to permit increased stuffability; enhanced translucency, smokability and slipperiness and possessing substantially increased water, all of which attributes are contradistinguished from the identical and untenderized product.

13. Enzyme tenderized, normally tough animal tissue characterized by substantially increased tenderness of the connective tissue component thereof and by a substantially increased moisture content, as compared with an identical but untreated animal tissue, said animal tissue having been subjected to the action of an added proteolytic enzyme for a sufficient time and at a temperature within the active range of said proteolytic enzyme but above refrigeration temperature to cause such tenderization, but without materially disintegrating said tissues, whereby said animal tissues are rendered capable of handling and shipment over prolonged periods of time without continued and complete enzymic disintegration of said tissues.

14. The product as defined in claim 13 in which the enzymic action has been interrupted, before disintegration of the animal tissues by heat treatment.

15. The product as defined in claim 13 which is characterized further by having had applied thereto an aqueous solution of proteolytic enzyme material in an amount equal to about 6% of the weight of said product whereby to substantially increase the moisture content of the product.

LEVI SCOTT PADDOCK.
JOHN M. RAMSBOTTOM.